United States Patent [19]

Kimura

[11] Patent Number: 5,301,276
[45] Date of Patent: Apr. 5, 1994

[54] METHOD AND DEVICE FOR ASSIGNING I/O ADDRESS IN DATA PROCESSING APPARATUS

[75] Inventor: Minoru Kimura, Ora, Japan
[73] Assignee: Sanyo Electric Co., Ltd., Osaka, Japan
[21] Appl. No.: 715,998
[22] Filed: Jun. 17, 1991

[30] Foreign Application Priority Data

Jun. 29, 1990 [JP] Japan ................... 2-171845

[51] Int. Cl.⁵ .............................. G06F 15/02
[52] U.S. Cl. .................................. 395/275
[58] Field of Search ............... 395/275; 364/200, 900; 371/11.1

[56] References Cited

U.S. PATENT DOCUMENTS

| | | | |
|---|---|---|---|
| 4,556,953 | 12/1985 | Caprio et al. | 364/900 |
| 4,760,553 | 7/1988 | Buckley et al. | 364/900 |
| 4,775,931 | 10/1988 | Dickie et al. | 364/200 |
| 4,964,038 | 10/1990 | Louis et al. | 395/275 |
| 5,038,320 | 8/1991 | Heath et al. | 364/900 |

FOREIGN PATENT DOCUMENTS

| | | |
|---|---|---|
| 0350917A | 1/1990 | European Pat. Off. |
| 63-116258 | 5/1985 | Japan |
| 60-214063A | 10/1985 | Japan |
| 63-289661A | 11/1988 | Japan |

OTHER PUBLICATIONS

"Parity Check Circuit for Detecting Missing Feature Cards", L. C. Eggerbrecht et al., p. 4366, line 1-15. IBM Technical Disclosure Bulletin, vol. 22, No. 10, Mar. 1980, pp. 4366-4368.

Primary Examiner—Dale M. Shaw
Assistant Examiner—Moustafa M. Meky
Attorney, Agent, or Firm—Oliff & Berridge

[57] ABSTRACT

An I/O address assigning device in a data processing apparatus having a standard port provided in the main unit for connecting the main unit to an I/O address assigning device so as to increase the function of the data processing apparatus and an I/O connecting portion for connecting an additional board provided with an I/O port therein. The I/O address assigning device comprises a control means for disabling the I/O port in the main unit for operation in order to prevent conflict of the I/O port in the main unit and on an additional board which have the same address, a detecting means for detecting the preset I/O address of the additional I/O port in the state in which the I/O port in the main unit is disabled, and an address assigning means for assigning an I/O address different from the preset address of the additional I/O port which is detected by the detecting means to the I/O port in the main unit. When the I/O address of the standard port on the additional board which is detected by the detecting means in the state in which the standard port in the main unit is disabled is the same as the I/O address of the standard port in the main unit, an I/O address different from that of the standard port on the additional board is assigned to the standard port on the main unit.

14 Claims, 5 Drawing Sheets

METHOD AND DEVICE FOR ASSIGNING I/O ADDRESS IN DATA PROCESSING APPARATUS

BACKGROUND OF THE INVENTION

1. Field of the Invention

The present invention relates to a data processing apparatus and, more particularly, to a method and a device for assigning I/O address in a data processing apparatus which is capable of changing the assignment of the address to an I/O port.

2. Description of the Related Art

Printer, RS-232C, floppy disk drive (FDD), hard disk drive (HDD), etc. are connected to personal computers and the like through standard ports. Since the number of standard ports is different depending upon the demand of the user, the main unit of a personal computer is generally provided with an extension slot (I/O slot) and a standard port is added by inserting an additional board provided with a standard port into the I/O slot.

Devices such as a printer are often necessary to a personal computer. Most personal computers are therefore provided with standard ports for such devices in the main unit as the standard equipments.

In this case, if the standard port in the main unit and the standard port on the additional board which is inserted into the I/O slot have the same function, since the addresses of both standard ports are the same, there is a concern that both standard ports will not be operable due to the conflict in addresses.

To preclude this possibility, an additional board generally has a DIP switch for setting the address of the standard port thereon, and it is possible to change the I/O address of the standard port on the additional board by operating the DIP switch, thereby preventing the conflict of both standard ports.

Figure 5:
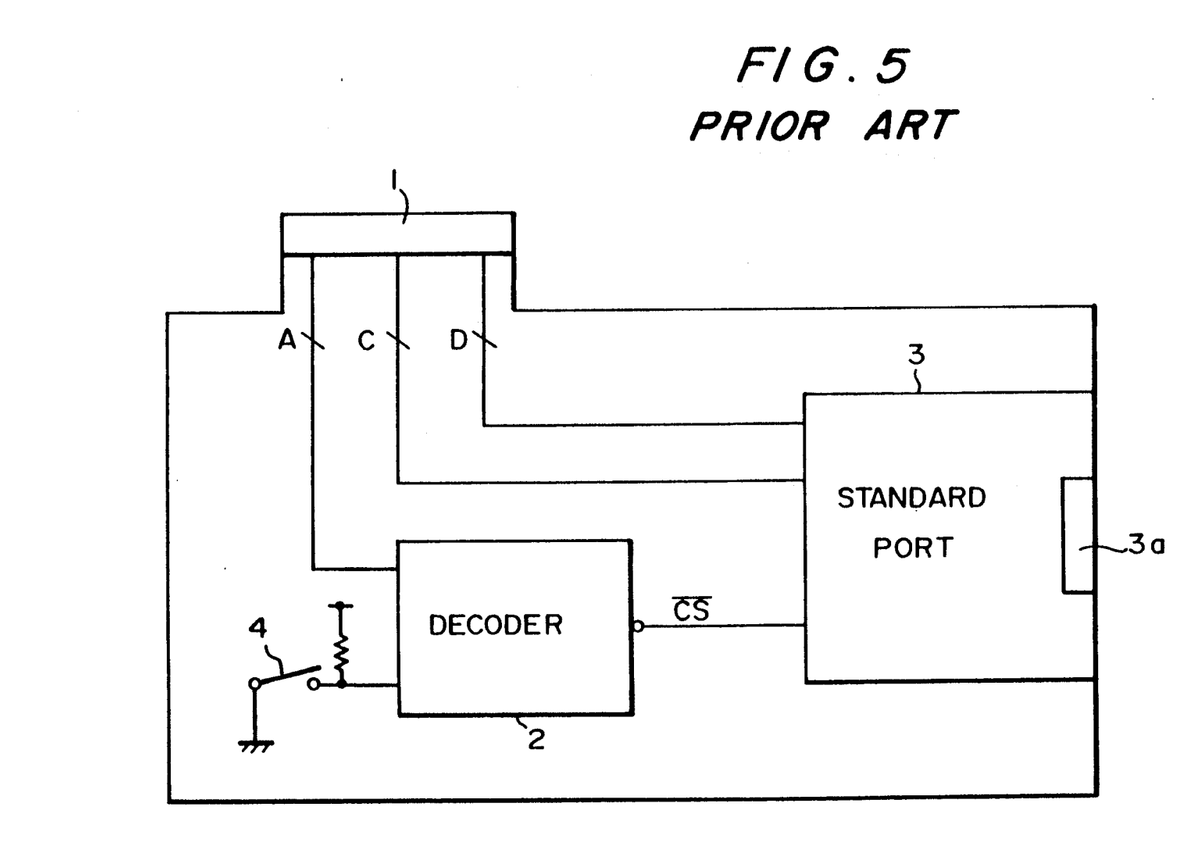
FIG. 5 is a block diagram of the schematic structure of a conventional additional board.

As shown in FIG. 5, such an additional board is provided with a connecting portion 1 which is connected to the main unit, a decoder 2, a standard port 3 and a DIP switch 4. An address signal supplied from the main unit through an address bus A is input to the decoder 2. When the address signal indicates a preset value (preset address), the decoder 2 supplies a decoding signal (chip selecting signal CS), which indicates that the standard port 3 is selected, to the standard port 3.

The I/O address which is to be assigned to the standard port 3 is determined in accordance with the I/O device which is to be connected to the standard port 3. There are two addresses, for example, a primary address and a secondary address for one I/O device. The decoder 2 can decode either of the addresses.

The DIP switch 4 is connected to the decoder 2, and the decoder 2 can select the I/O address to be decoded by turning on and off the DIP switch 4. A connector 3a connects the additional board to an external device such as a printer.

When the address of the standard port 3 on the additional board is actually assigned, the DIP switch 4 is operated so as to prevent the address of the standard port 3 on the additional board from being identical to the address of the standard port in the main unit, thereby preventing the conflict of both standard ports.

However, in setting the additional board, it is necessary for the user to refer to the manual or the like before setting the DIP switch and then to operate the DIP switch. This operation is troublesome and involves a possibility of error when setting the DIP switch. In addition, in personal computers or the like, since a new model is frequently developed, the corresponding model is sometimes not described in the manual for the additional board. In such case, it is necessary for the user to refer to the manuals for both the main unit and the additional board in order to know the addresses of the standard port in the main unit and the standard port on the additional board and to set the DIP switch so as to prevent the conflict of both standard ports. This operation is very difficult. It is therefore demanded to facilitate the operation at the time of using the additional board such as the setting of the DIP switch and to omit such operation, if possible, thereby preventing an error in setting the DIP switch.

SUMMARY OF THE INVENTION

Accordingly, it is an object of the present invention to solve the above-described problems in the related art and to provide an I/O address assigning device of a data processing apparatus which obviates the operation of setting a DIP switch by the user without any trouble in using an additional board.

To achieve this end, an I/O address assigning device of a computer according to the present invention comprises: a control means for disabling a first I/O port for operation; a detecting means for detecting the preset I/O address of an additional I/O port which is added to the first I/O port in the state in which the first I/O port is disabled; and an address assigning means for assigning an address different from the preset I/O address which is detected by the detecting means to the first I/O port.

According to the I/O address assigning device of a data processing apparatus of the present invention, the control means disables a first I/O port out of a plurality of I/O ports for operation. In the state in which the first I/O port is disabled, the detecting means detects the preset address of an additional I/O port. If the preset address of the additional I/O port which is detected by the detecting means is the same as the address of the first I/O port, the address assigning means assigns an address different from the address of the additional I/O port to the first I/O port. In this way, when the addresses of the additional I/O port and the first I/O port are the same, the address of the first I/O port is changed so as to prevent coincidence.

The above and other objects, features and advantages of the present invention will become clear from the following description of the preferred embodiment thereof, taken in conjunction with the accompanying drawings.

DESCRIPTION OF THE PREFERRED EMBODIMENTS

An I/O address assigning device of a data processing apparatus according to the present invention will be explained hereinunder with reference to the accompanying drawings.

Figure 1:
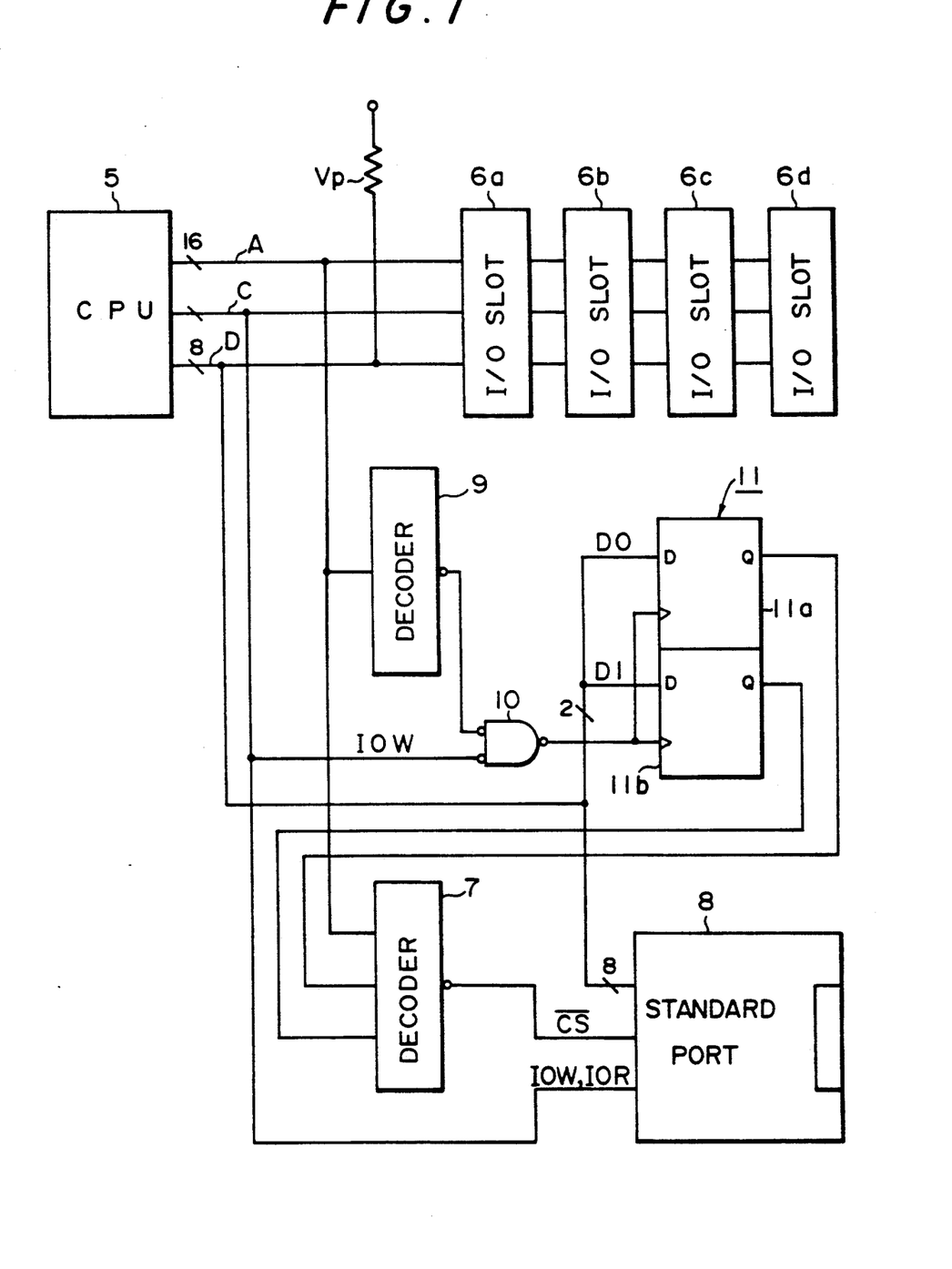
FIG. 1 is a block diagram of the schematic structure of an embodiment of an I/O address assigning device of a data processing apparatus according to the present invention.

FIG. 1 is a block diagram of the entire structure of an embodiment of the present invention. These elements are provided in the main unit. A CPU 5 is connected to an address bus A supplying an address signal of 16 bits (A0 to A15) which indicates what is to be accessed. The CPU 5 is also connected to, a control bus C for supplying an operation command such as IOW, IOR, MEMR and MEMW, and to a data bus D supplying data of 8 bits (D0 to D7).

The I/O address assigning device in a data processing apparatus of this embodiment is provided with four I/O slots 6a to 6d into which an additional board can be inserted. Each of the address bus A, the control bus C and the data bus D is connected to these I/O slots. Since all the bits of the data bus D are pulled up by a pull-up means Vp, the data bus D becomes FFH (all "1") when there is no data on the data bus D.

The address bus A is connected to the input terminal of a decoder 7. The decoder 7 outputs a decoding signal (chip selecting signal $\overline{CS}$) indicating that a standard port 8 is selected when the address of the address bus A reaches a predetermined value (e.g., 278 H).

The output terminal of the decoder 7 is connected to the input terminal of the standard port 8 in the main unit, and when the chip selecting signal $\overline{CS}$ is low [L], the standard port 8 in the main unit inputs or outputs data. For this purpose, the data bus D and the control bus C are also connected to the standard port 8 in the main unit.

Figure 2:
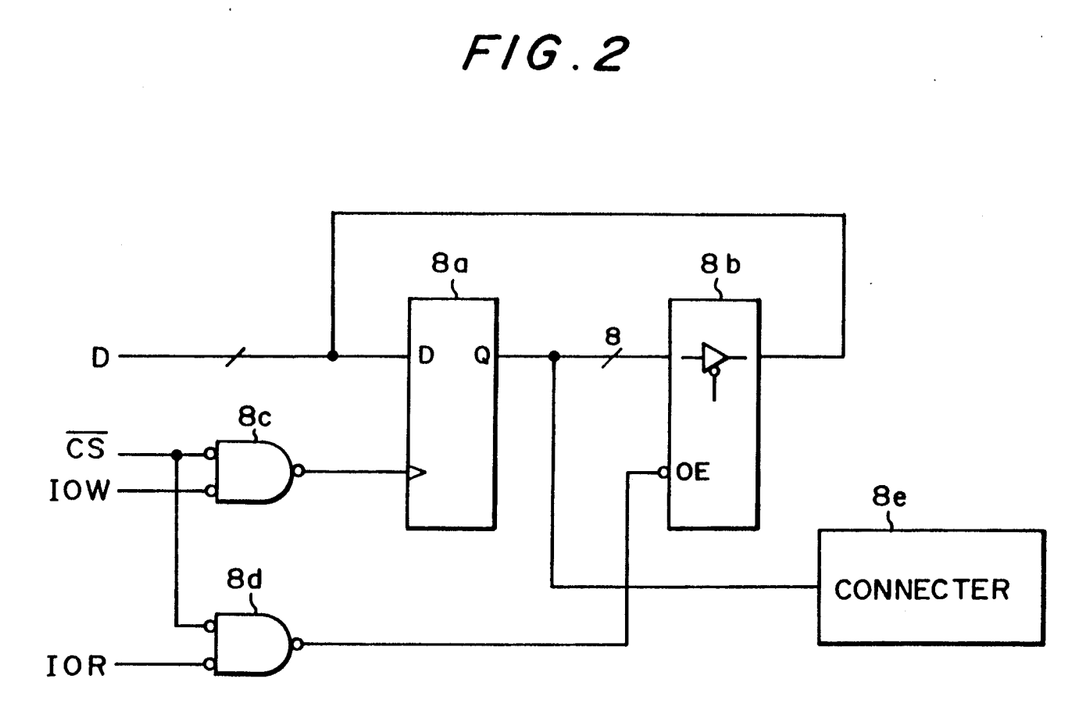
FIG. 2 is a block diagram of the structure of the main part of a standard port in the embodiment shown in FIG. 1.

The structure of the standard port 8 is shown in FIG. 2. The standard port 8 in the main unit is provided with a data register 8a to which the data bus D is connected so as to enable data reading and writing, a buffer 8b for judging whether or not the output of the register 8a is to be returned to the data bus D, an OR gate 8c for issuing a data-fetch command when a write command is issued, an OR gate 8d for allowing the buffer 8b to output data when a read command is issued, and a connector 8e for connecting the standard port 8 to an external device, as shown in FIG. 2.

When the CPU 5 issues a write command to the standard port 8 in the main unit, the value of the address bus A reaches the address of the standard port 8 in the main unit and the chip selecting signal $\overline{CS}$ from the decoder 7 becomes [L]. Since the signal IOW from the control bus C becomes [L]in accordance with the write command, the OR gate 8c outputs [L]and the register 8a fetches the data from the data bus D.

On the other hand, when the CPU 5 issues a read command to the standard port 8 in the main unit, the chip selecting signal $\overline{CS}$ from the decoder 7 becomes [L]as in the case of the write command. Since the signal IOR from the control bus C becomes [L]in accordance with the read command, the OR gate 8d outputs [L]. The buffer 8b is allowed to output data, and the output of the register 8a is supplied to the data bus D. In this way, the CPU 5 can both write desired data into the register 8a of the standard port 8 in the main unit and read the data from the register 8a.

The structure of an additional standard port provided on an additional board is the same as the standard port 8 in the main unit shown in FIG. 2.

In FIG. 1, this embodiment is provided with a decoder 9, an OR gate 10 and an address switching register 11 of 2 bits. The address bus A is connected to the input terminal of the decoder 9 and when the value of the address bus A reaches a predetermined value, the decoder 9 outputs [L]. The address for decoder 9 is different from the address of the standard port 8. The output of the decoder 9 is input to the OR gate 10 together with the signal IOW from the control bus C.

The address switching register 11 is composed of two flip-flops, namely, an enable bit 11a and an address select bit 11b. The output of the OR gate 10 is input to the clock input terminals of the two flip-flops 11a, 11b, and 2 bits (D0, D1) of the data bus D are connected to the data input terminals of the enable bit 11a and the address select bit 11b, respectively.

When the CPU 5 issues a write command while addressing the address switching register 11, the decoder 9 outputs [L]. The signal IOW from the control bus C becomes [L]in accordance with the write command, and the output of the OR gate 10 also becomes [L]. Therefore, the data D0 and D1 of data bus D D0 and D1 are fetched into the enable bit 11a and the address select bit 11b, respectively, of the address switching register 11.

The outputs of the enable bit 11a and the address select bit 11b of the address switching register 11 are supplied to the decoder 7 as an enabling signal and an address selecting signal, respectively.

The decoder 7 has a gate on the output side which does not output [L]unless the enabling signal is [L]. In other words, it is possible to so control the decoder 7 as to write/read data into/from the standard port 8 in the main unit in correspondence with the data stored in the enable bit 11a.

The decoder 7 has a gate on the input side which outputs [L] as the chip selecting signal $\overline{CS}$ at a primary address (e.g., [278 H]) when the address selecting signal of the address switching register 11 is [H] and outputs [L] as the chip selecting signal $\overline{CS}$ at a secondary address (e.g., [378 H]) when the address selecting signal of the address switching register 11 is [L]. It is therefore possible to change the I/O address at which [L] is output as the chip selecting signal $\overline{CS}$ from the decoder 7 by the data which is stored in the address select bit 11b.

Figure 3:
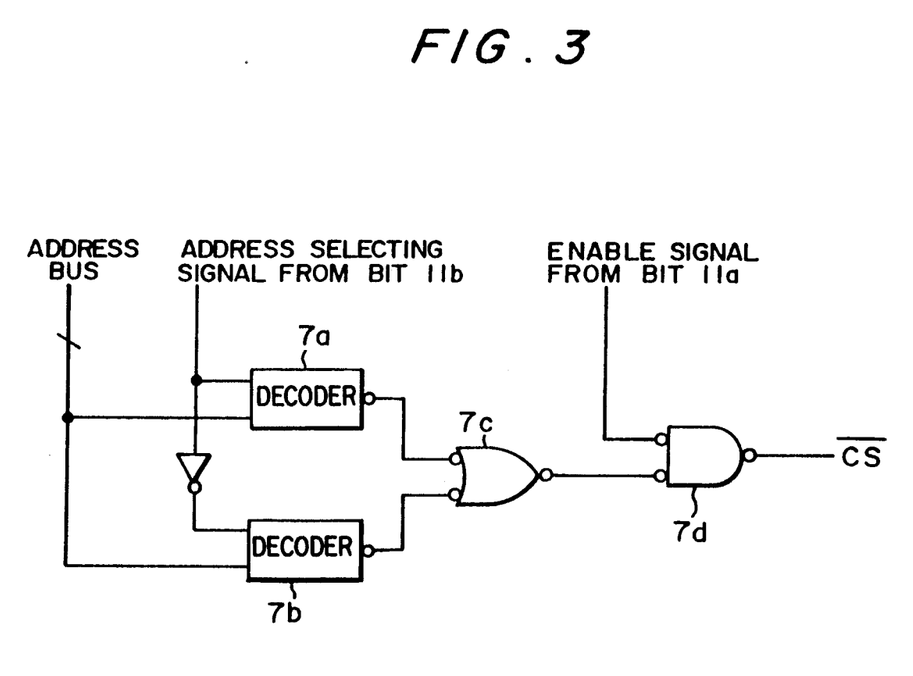
FIG. 3 is a block diagram of the structure of the decoder 7 shown in FIG. 1.

The concrete structure of the decoder 7 is shown in FIG. 3. The decoder 7 is composed of a primary address decoder gate 7a for decoding the primary address, a secondary address decoder 7b for decoding the secondary address, an AND gate 7c and an OR gate 7d. The address on the address bus A and the address selecting signal from the address select bit 11b of the address switching register 11 are supplied to the primary address decoder 7a, while the address on the address bus A and the inverted address selecting signal from the address select bit 11b of the address switching register 11 are supplied to the secondary address decoder 7b in the inverted form. Therefore, when the address on the address bus A is the primary address and the address selecting signal is [H], the primary address decoder 7a outputs [L]. On the other hand, when the address on the address bus A is the secondary address and the address selecting signal is [L], the secondary address decoder 7b outputs [L]. In the other cases, both address decoders 7a, 7b output [H].

The outputs of the address decoders 7a, 7b are input to the AND gate 7c. Therefore, when the output of either of the address decoders 7a, 7b is [L], the AND gate 7c outputs [L]. The OR gate 7d is supplied with the output of the AND gate 7c and the enable signal from the enable bit 11a of the address switching register 11. Therefore, only when the enable signal is [L] and the output of the AND gate 7c is [L] will the output of OR gate 7d, the chip selecting signal $\overline{CS}$, be [L]. In this way, the above-described operation is achieved.

Figure 4:
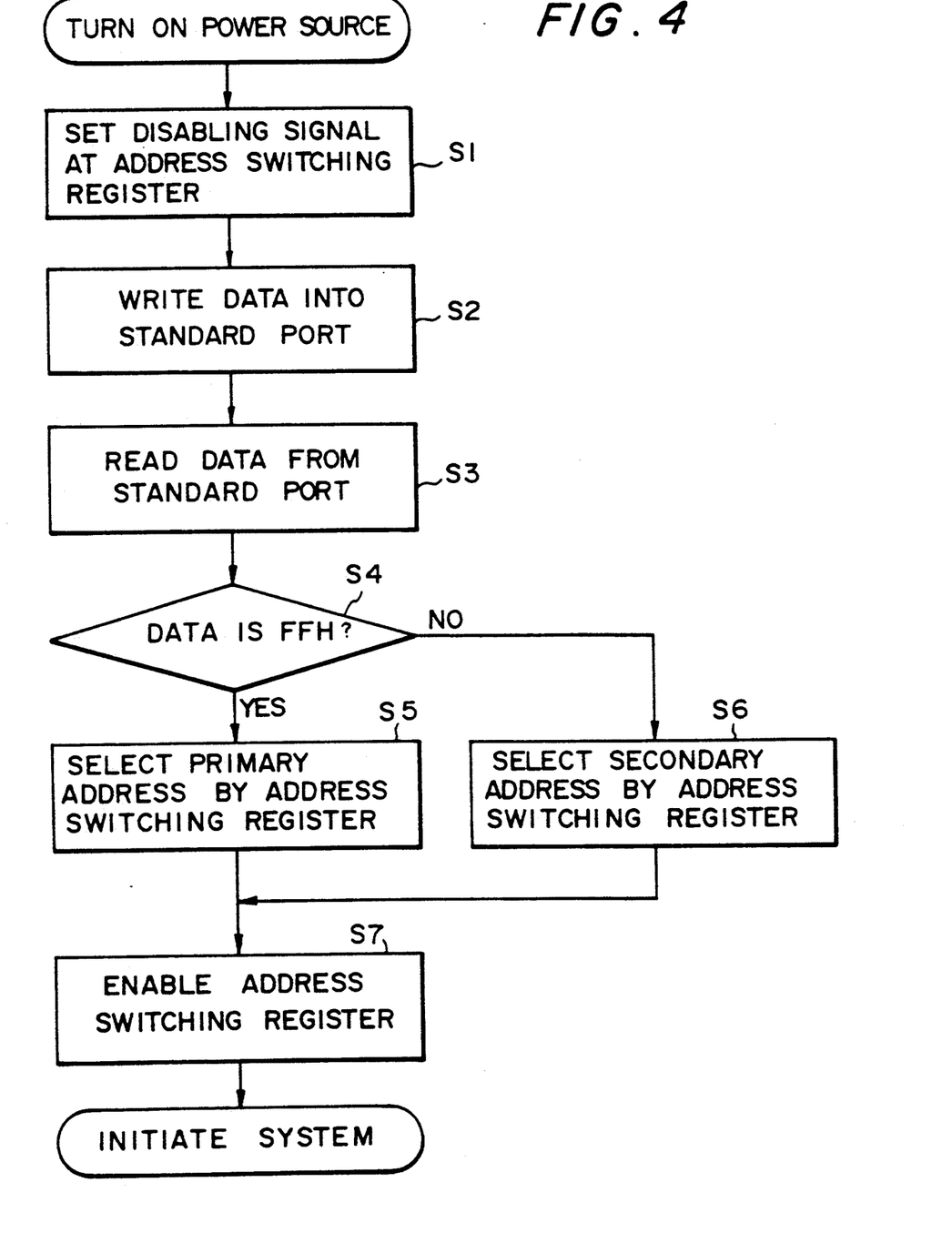
FIG. 4 is a flow chart of the operation of the embodiment shown in FIG. 1.

The operation of this embodiment will now be explained with reference to FIG. 4. In this embodiment, an I/O address assigning device for a printer is adopted as the I/O address assigning device.

When the power source is turned on, data (e.g., "1") for disabling the standard port 8 in the main unit for operation is first written into the enable bit 11a of the address switching register 11 (S1). The CPU 5 writes predetermined data (other than FFH) at the address (primary address) of the standard port for a printer which is ordinarily used (S2). The data is read from the standard port at the address at which the data is written (S3), and judgment is made as to whether or not the data read out is [FFH] (all "1") (S4).

The access to the standard port 8 in the main board is inhibited at S1. Since the data bus D is pulled up by the pullup means Vp, the data read out is [FFH] unless an additional board provided with a standard port to which the primary address is assigned is inserted into any of the I/O slots 6a to 6d. If the additional board provided with a standard port is inserted into the I/O slot, the data written at S2 is read out.

If the answer is [Y] at S4, data (e.g., "1") for designating the primary address is written in the address select bit 11b of the address switching register 11 (S5). On the other hand, if the answer is [N] at S4, it means that the standard port having the primary address is set as an additional board, so that data (e.g., "0") for designating the secondary address is written into the address select bit 11b (S6).

Data for designating an enabling process is then written into the enable bit 11a of the address switching register 11, thereby allowing the decoder 7 to output data (S7).

As described above, if there is no additional board provided with a standard port having the same address as the primary address of the standard port 8 in the main unit, the address of the standard port 8 in the main unit is set at the primary address. On the other hand, if there is an additional board provided with a standard port having the same address as the primary address of the standard port 8 in the main unit, the address of the standard port 8 in the main unit is set at the secondary address.

Accordingly, it is possible to prevent the conflict of the standard port on the additional board and the standard port 8 in the main unit without the need for setting a DIP switch of the additional board by the user.

In this embodiment, the address select bit 11b has 1 bit and two kinds of addresses are switched over to each other, but it is possible to increase the number of addresses switched by increasing the number of bits of the address select bit 11b.

Although the standard port in this embodiment is for a printer, it may be an I/O address assigning device for an external FDD (floppy disk drive), an RS-232C (an interface for transmitting serial data) or the like. In addition, since these standard ports have a register such as a status register which takes a value other than "FFH" when it is reset, the I/O address may be detected by utilizing this register.

For example, if the standard port is for an external FDD, after the power source is turned on, a floppy disk controller (FDC) is reset by a software, and the status register in the FDC is set at the initial value (not [FFH]). The value of the status register in the FDC is read out to judge whether or not the value is [FFH]. If the data read out is ]FFH], it means that there is no status register at the address at which the data is read out and, hence, an additional board is not present. By setting data in the address select bit in accordance with the result, it is possible to prevent conflict in the I/O address assigning devices in the same way as in the above-described embodiment.

If the standard port is for an external RS-232C, after the power source is turned on, the RS-232C is reset by a hardware, and the value of the status register is read out. By judging whether or not this value is [FFH], it is possible to judge as to the presence or absence of the RS-232C and to prevent conflict of the I/O address assigning devices in the same way as in the above-described embodiment.

As described above, according to an I/O address assigning device of a data processing apparatus of the present invention, it is possible not only to inhibit the access to the I/O port in the apparatus but also to automatically change the assignment of the I/O address. That is, it is possible to identify the address of another I/O port added thereto and set the address of the original I/O port at an address which prevents conflict or both I/O ports.

It is thus possible to obviate the operation of setting a DIP switch of the additional board by the user.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An I/O address assigning device in a data processing apparatus comprising:
   a first I/O port for connecting the data processing apparatus to an I/O port device, said first I/O port having an address assigned from a plurality of predetermined I/O addresses;
   an I/O connecting portion for connecting an additional I/O port to the data processing apparatus, the additional I/O port having an address assigned from the plurality of predetermined I/O addresses and a register that stores data;
   control means for disabling on operation of the first I/O port;
   detecting means for detecting a preset I/O address of the additional I/O port while the first I/O port is disabled, the detecting means including:
      reading and writing means for writing and reading data at the predetermined I/O address;
      identification detecting means for detecting if the data written by the reading and writing means is identified with data read by the reading and writing means; and
      judging means for judging that the predetermined I/O address at which the data is written to and read from is the I/O address of the additional I/O port when identification is detected by the identification detecting means; and assigning means for assigning to the first I/O port an I/O address different from the preset I/O address of the additional I/O port in response to the detecting means detecting the preset I/O address.

2. An I/O address assigning device in a data processing apparatus according to claim 1, wherein the control means includes:

a first register in which data designating a disabled state is set; and disabling means for disabling a chip selecting signal to be supplied to the first I/O port in accordance with the output of the first register.

3. An I/O address assigning device in a data processing apparatus according to claim 1, wherein the assigning means comprises:

an address selecting register which stores information indicating which I/O address is assigned to the first I/O port; and an address decoder for inputting an address signal and outputting a chip selecting signal to the first I/O port when the address signal is an I/O address which corresponds to the information stored in the address selecting register.

4. An I/O address assigning device in a data processing apparatus according to claim 1, wherein the control means, the detecting means and the assigning means are started when the power source is turned on.

5. An I/O address assigning device in a data processing apparatus according to claim 1, wherein the assigning means assigns the predetermined I/O address, which the data is written to and read from, to the first I/O port when the identification is not detected by the identification detecting means.

6. An I/O address assigning device in a data processing apparatus according to claim 1, wherein the first I/O port and the additional I/O port are standard ports each having addresses which are assigned from a plurality of predetermined addresses determined in response to I/O devices connected thereto.

7. A method of addressing an I/O address in a data processing apparatus having a first I/O port for connecting the data processing apparatus to an I/O device and an I/O connecting portion for connecting an additional I/O port to the data processing apparatus, the additional I/O port having a register which stores data, and each of the first I/O port and the additional I/O port has an address which is assigned from a plurality of predetermined I/O addresses, the method comprising the steps of:

disabling an operation of the first I/O port;

detecting a preset I/O address of the additional I/O port while the first I/O port is disabled, the detecting step further including the steps of:

writing and reading data at the predetermined I/O address:

identification detecting if the data written by the writing and reading data step is identified with data read by the reading and writing data step; and judging that the predetermined I/O address at which the data is written to and read from is the I/O address of the additional I/O port when identification is detected by the identification detecting step; and assigning an I/O address to the first I/O port which is different from the preset I/O address of the additional I/O port detected by the detecting means.

8. An I/O address assigning device in a data processing apparatus comprising:

a first I/O port for connecting the data processing apparatus to an I/O device, the first I/O port having an address assigned from a plurality of predetermined I/O addresses;

an I/O connecting portion for connecting an additional I/O port to the data processing apparatus, the additional I/O port having an address assigned from a plurality of predetermined I/O addresses and having a register for storing a predetermined value when the power source is turned on;

control means for disabling an operation of the first I/O port;

detecting means for detecting a preset I/O address of the additional I/O port while the first I/O port is disabled, the detecting means including:

reading means for reading data at the predetermined I/O address;

an identification detecting means for detecting if the data read is identified with the predetermined value; and judging means for judging that the predetermined I/O address, which the data is read from, is the I/O address of the additional I/O port when identification is detected by the identification detecting means; and assigning means for assigning to the first I/O port an I/O address different from the preset I/O address of the additional I/O port in response to the detecting means detecting the preset I/O address.

9. An I/O address assigning device in a data processing apparatus according to claim 8, wherein the assigning means assigns the predetermined I/O address, which the data is read from to the first I/O port when the identification is not detected by the identification detecting means.

10. An I/O address assigning device in a data processing apparatus according to claim 8, wherein the control means includes:

a first register in which data designating a disabled state is set; and disabling means for disabling a chip selecting signal to be supplied to the first I/O port in accordance with the output of the first register.

11. An I/O address assigning device in a data processing apparatus according to claim 8, wherein the assigning means comprises:

an address selecting register which stores information indicating which I/O address is assigned to the first I/O port; and an address decoder for inputting an address signal and outputting a chip selecting signal to the first I/O port when the address signal is an I/O address which corresponds to the information stored in the address selecting register.

12. An I/O address assigning device in a data processing apparatus according to claim 8, wherein the control means, the detecting means and the assigning means are started when the power source is turned on.

13. An I/O address assigning device in a data processing apparatus according to claim 8, wherein the first I/O port and the additional I/O port are standard ports each having addresses which are assigned from a plurality of predetermined addresses determined in response to I/O devices connected thereto.

14. A method of addressing an I/O address in a data processing apparatus having a first I/O port for connecting the data processing apparatus to an I/O device and an I/O connecting portion for connecting an additional I/O port to the data processing apparatus, the additional I/O port having a register in which a predetermined value is stored when a power source is turned on, and each of the first I/O port and the additional I/O port has an address which is assigned from a plurality of predetermined I/O addresses, the method comprising the steps of:

disabling an operation of the first I/O port;

detecting a preset I/O address of the additional I/O port while the first I/O port is disabled, the detecting step further including the steps of:

reading data at the predetermined I/O address;

identification detecting if the data read is identified with the predetermined value; and judging that the predetermined I/O address, which the data is read from, is the I/O address of the additional I/O port when identification is detected by the identification detecting step; and assigning an I/O address to the first I/O port which is different from the preset I/O address of the additional I/O port detected by the detecting means.

* * * * *